United States Patent [19]
Lee

[11] Patent Number: 5,740,680
[45] Date of Patent: Apr. 21, 1998

[54] DEODORIZING REINFORCED CONTAINER FOR LOW PRESSURE, LOW TEMPERTURE AND HUMIDIFIED STORAGE

[76] Inventor: Fong-Chuan Lee, Room 332, Fishing Industrial Building, No. 3, Yu-Kang East 2nd Road, Chien-Chen District, Kaohsiung (806), Taiwan

[21] Appl. No.: 697,081

[22] Filed: Aug. 19, 1996

[51] Int. Cl.$^6$ ............................................. F25B 19/00
[52] U.S. Cl. ............................ 62/268; 62/269; 220/421; 220/445
[58] Field of Search ............................ 62/78, 268, 269; 220/421, 445

[56] References Cited

U.S. PATENT DOCUMENTS

| | | | |
|---|---|---|---|
| 1,088,453 | 2/1914 | Roberts | 62/268 |
| 2,345,209 | 3/1944 | Lodwig | 62/268 |

*Primary Examiner*—John M. Sollecito

[57] ABSTRACT

A deodorizing reinforced container includes: a housing having an outer shell lined with thermally insulative lining on an inside surface of the outer shell, and an inner shell defining a storing chamber within the inner shell; a plurality of reinforcing ribs longitudinally and latitudinally retained between the inner shell and the outer shell of the housing for reinforcing the strength of the housing for sustaining a hypobaric pressure; a cooling hypobaric device and a humidifier provided in the storing chamber for producing low pressure, low temperature and increasing humidity in the storing chamber for well preservation of foods, fruits or other storing materials within the housing; and a deodorizing device provided in a sandwiched space between the inner and outer shells for absorbing unpleasant odors and absorbing ethylene or other excess unexpected gases which may cause aging of the fruits or vegetables as stored in the housing for freshening the stored matters in the housing.

4 Claims, 3 Drawing Sheets

DEODORIZING REINFORCED CONTAINER FOR LOW PRESSURE, LOW TEMPERATURE AND HUMIDIFIED STORAGE

BACKGROUND OF THE INVENTION

U.S. Pat. No. 3,913,661 entitled "Low Pressure Storage of Metabolically Active Material with Open Cycle Refrigeration" to Stanley P Burg et al. disclosed a controlled refrigerated storage environment conducive to preservation of stored respiring food tissue or other respiring matter by expanding atmospheric air and raising its relative humidity so that the air is cooled by its expansion and by evaporation of said water to a preservation-conducive temperature and flowing the cooled expanded water-saturated air around the stored matter to sweep away gaseous products of metabolic reaction emitted from the stored matter.

However, such a conventional low pressure storage has the following drawbacks:

1. In order to sustain the vacuum pressure within the insulated walls 10, the insulated walls 10 should be made of thick, heavy and strong metal material to increase the weight of the storage and to thereby increase transportation cost or inconvenience for handling the heavy container.

2. Even an evaporator 22 is provided to saturate the air within the storage, the moisture as laden in the air in the chamber 12 is not enough for dissolving the ethylene which is emitted from ripening fruits as stored in the chamber 12. So, the ethylene gas produced in the storage can not be efficiently absorbed or removed to thereby deteriorate the product quality of the stored matter as influenced by the ethylene gas.

3. There is not provided with any deodorizer in the storage container. The stinking or unpleasant odor or smell produced in the container may cause problems of the environmental protection.

The present inventors have found the drawbacks of the U.S. Pat. No. 3,913,661 and invented the present deodorizing reinforced container for storing foods or materials under low pressure and temperature.

SUMMARY OF THE INVENTION

The object of the present invention is to provide a deodorizing reinforced container including: a housing having an outer shell lined with thermally insulative lining on an inside surface of the outer shell, and an inner shell defining a storing chamber within the inner shell; a plurality of reinforcing ribs longitudinally and latitudinally retained between the inner shell and the outer shell of the housing for reinforcing the strength of the housing for sustaining a hypobaric pressure; a cooling hypobaric device and a humidifier provided in the storing chamber for producing low pressure, low temperature and increasing humidity in the storing chamber for well preservation of foods, fruits or other storing materials within the housing; and a deodorizing device provided in a sandwiched space between the inner and outer shells for absorbing unpleasant odors and absorbing ethylene or other unexpected excess gas which may cause aging of the fruits or vegetables as stored in the housing for freshening the stored matters in the housing.

DETAILED DESCRIPTION

Figure 1:
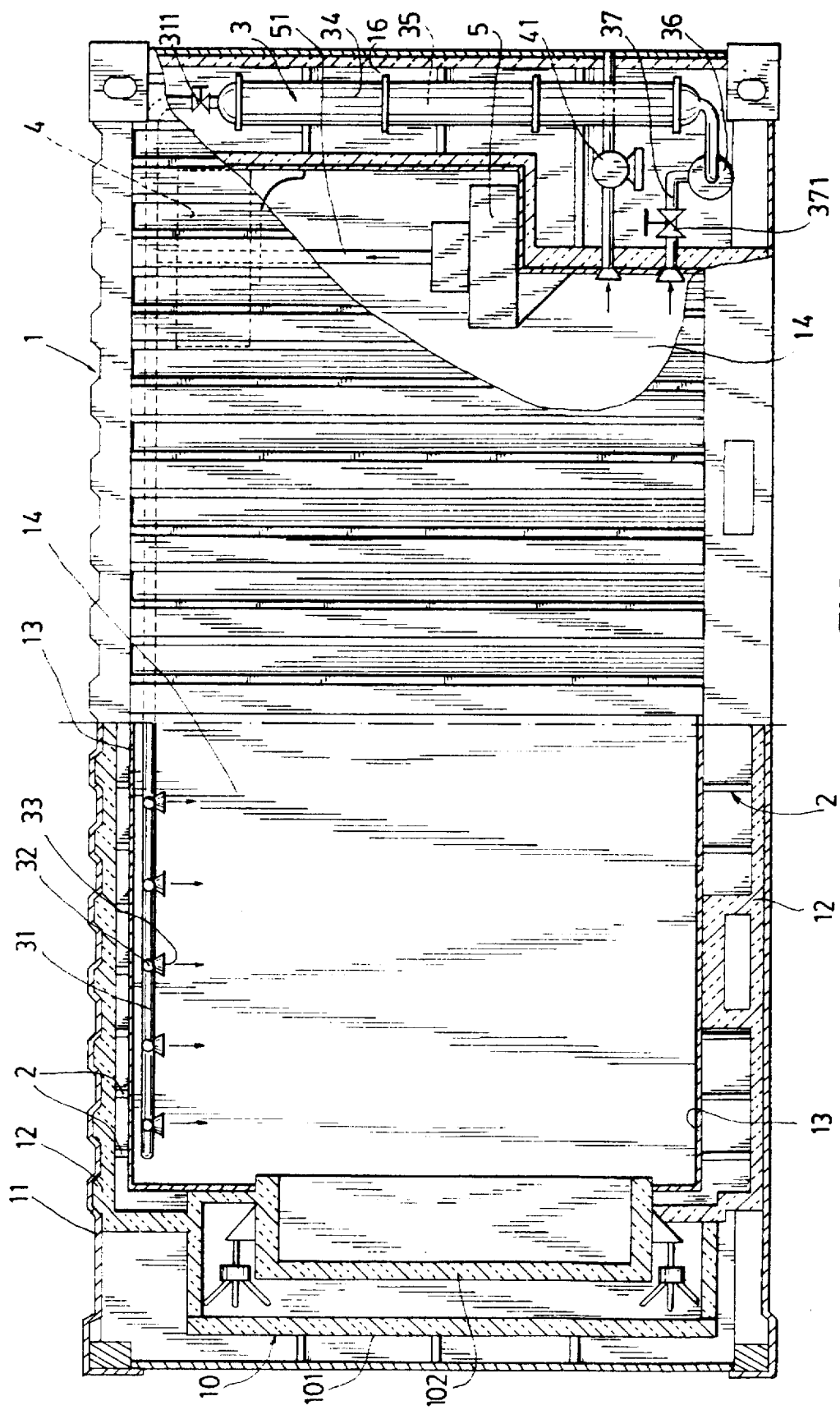
FIG. 1 is a partially cutaway front elevational view of the present invention.
Figure 2:
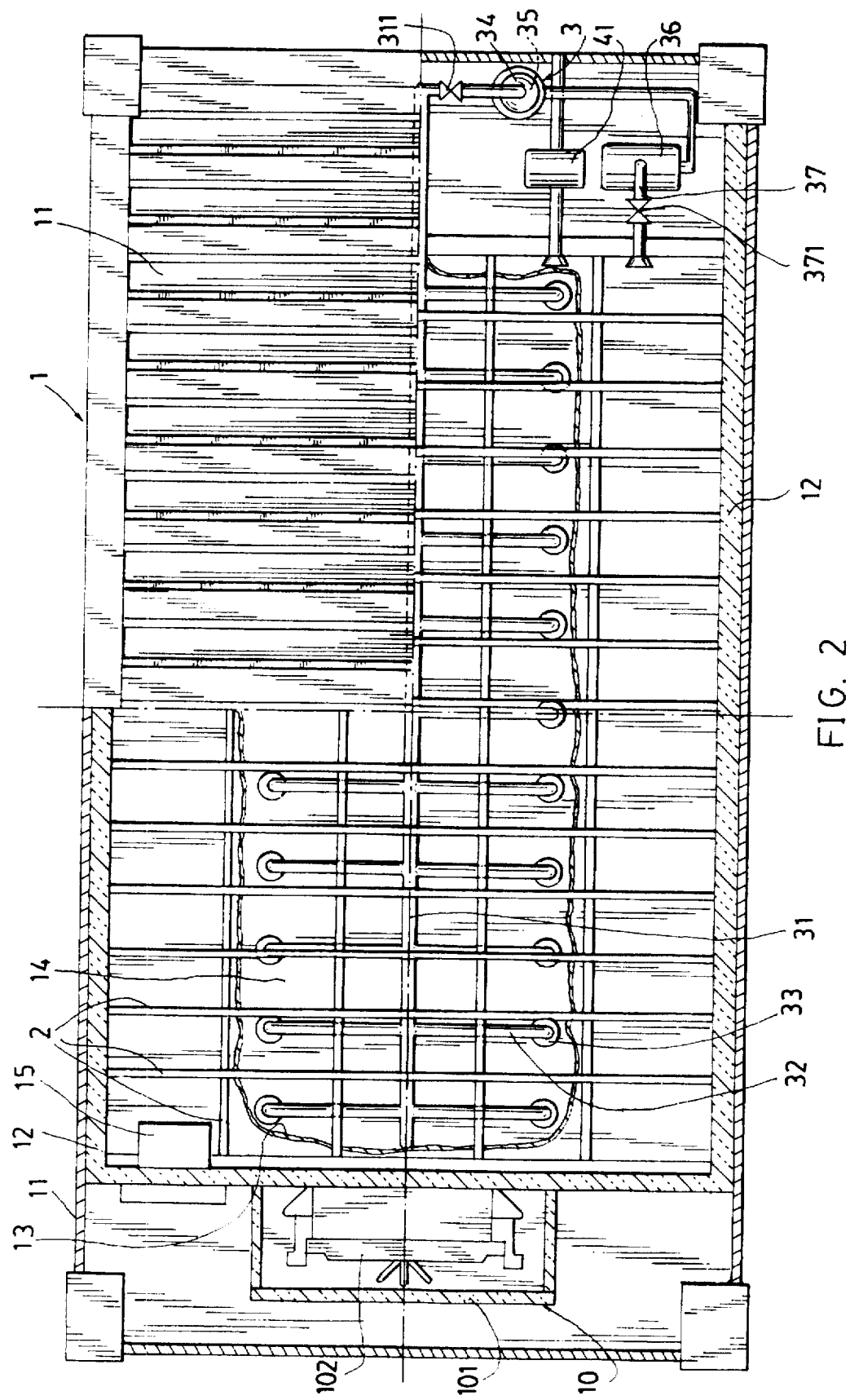
FIG. 2 is a partially cutaway top view of the present invention.
Figure 3:
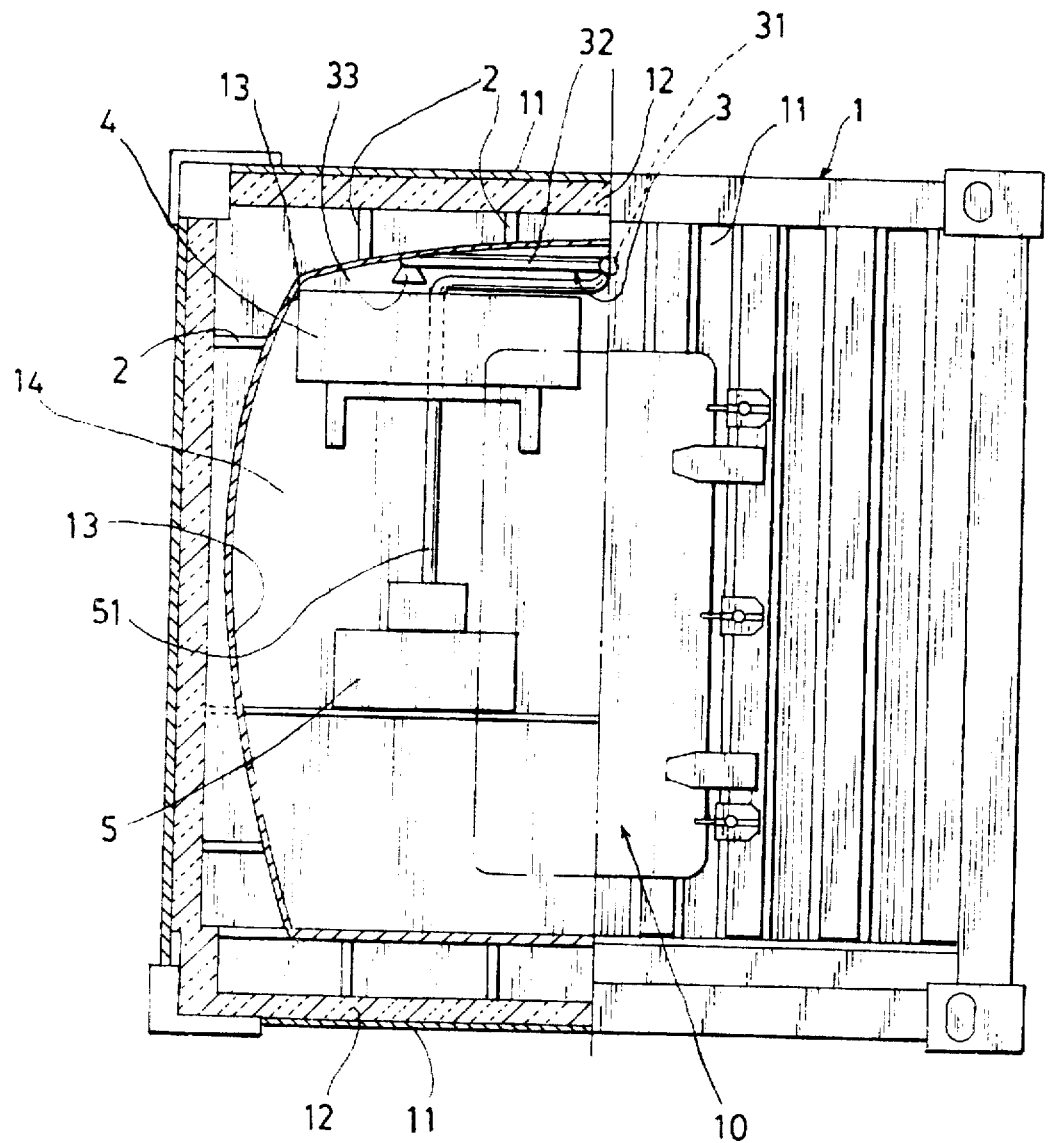
FIG. 3 is a side view of the present invention.

As shown in the drawing figures, the deodorizing reinforced container of the present invention comprises: a housing 1, a plurality of reinforcing ribs 2 longitudinally and latitudinally formed in the housing 1, a deodorizing means 3 provided in the housing 1 for absorbing odors or harmful gases as emitted from the stored matters (not shown) kept in the housing 1, a cooling hypobaric device 4 and a humidifier 5 installed in the housing 1 for respectively producing low pressure and lower temperature and increasing humidity in the housing 1.

The cooling hypobaric device 4 includes a cooler which may be a freezer, or a cooling device for producing low temperature in the housing 1, and a vacuum pump 41 for sucking air outwardly from the interior of the housing 1 for reducing the pressure in the container.

Both low pressure and low temperature are helpful for preserving foods, fruits and other stored matters within the housing 1 for a longer storage time and for maintaining good quality or freshness for the stored matters. A humidifier or water evaporator 5 is provided for humidifying the air in the housing 1.

The housing 1 may be served as a cargo container or shipping container for storing the agriculture products, foods, fruits, or other materials under lower pressure, low temperature and suitable humidity as effected by the present invention.

The low temperature as defined in the present invention is preferably ranging from 2° to 5°0 C.; and the low pressure preferably ranging −500—−560 mmHg. But, the temperature and the presssure value are not limited in the present invention.

Also, a parallelepiped shape of the housing 1 is prefered in this invention. However, the shapes and structures of the housing 1 are not limited in this invention.

The housing 1 includes: an outer shell 11 having a thermally insulative lining 12 lined on an inside surface of the outer shell 11, an inner shell 13 separating from the outer shell 11 and the insulative lining 12 to circumferentially confine a storing chamber 14 within the inner shell 13 for storing the matters to be preserved in the storing chamber 14, a door means 10 pivotally secured to a side portion of the housing 1 for closing or opening the housing 1, an observing window 15 provided in the housing 1 for visual inspection, and a sandwiched space 16 defined in between the inner shell 13 and the outer shell 11 for installing the deodorizing means 3 in the sandwiched space 16 in the housing 1; with the reinforcing ribs 2 longitudinally and latitudinally formed in the housing 1 as retained between the inner shell 13 and the outer shell 11.

Each reinforcing rib 2 is retained between the inner shell 13, and the outer shell 11 secured with the insulative lining 12. The insulative lining 12 may also be integrally formed with the outer shell 11 to be a thermally insulative outer shell. As reinforced by the reinforcing ribs 2 of the present invention, the thickness of the outer shell 1 for safely sustaining the hypobaric pressure may be properly reduced in order to decrease its weight in order to enhance handling convenience and to decrease the construction cost and the transportation cost.

The door means 10 includes: an outer thermally insulative door 101 and an inner air-tight sealing door 102 for preventing loss of vacuum and for preventing heat-transfer loss from the interior in the housing 1 to an outside environment.

The deodorizing means 3 includes: a discharging header 31 provided in an upper portion of the housing 1 having a plurality of branched pipes 32 juxtapositionally connected and fluidically communicated with the discharging header 31, and a plurality of spray nozzles 33 formed on each branched pipe 32 for discharging deodorized or treated air into the storing chamber 14 of the housing through the branched pipes 32 and the discharging header 31, a packing tower 34 having its outlet connected with the discharging header 31 and installed in the sandwiched space 16 between the inner shell 13 and the outer shell 11 having absorbent filler 35 filled in the packing tower 34 for absorbing unexpected or unpleasant odors and gases laden in the air as sucked from the storing chamber 14, and a circulating fan 36 connected to an inlet of the packing tower 34 for sucking air to be deodorized from the storing chamber 14 into the packing tower 34 through a suction pipe 37 connected between the fan 36 and the storing chamber 14.

The discharging header 31 may be provided with an outlet valve 311, while the suction pipe 37 may also be provided with an inlet valve 371 for on-off control of the air flow within the housing 1.

The absorbent filler 35 in the packing tower 34 includes: activated charcoal or carbon for absorbing odors, and potassium hypermanganate impregnated in vermiculite for absorbing ethylene gas as emitted from ripening fruits as stored in the storing chamber 14.

Other suitable deodorizing agents or gas absorbents may also be used in this invention, such as for absorbing or removing unexpected or excess oxygen, carbon dioxide and the others.

Several man holes (not shown) may be provided for maintaining the elements of the present invention.

The present invention is superior to the conventional low pressure storage with the following advantages:

1. As reinforced by the reinforcing rib 2, the outer shell 11 may be made of thin plate for reducing installation and handling cost of the container.

2. By the effect of the deodorizing means 3, the unpleasant odor can be absorbed and the ethylene or unexpected gases can be removed for keeping a more fresh preservation especially for the foods stored in the housing 1.

3. Lighter weight of the container can be achieved, which is especially helpful for air cargo transportation if the housing and the ribs are made of light weight material such as aluminum composites having good strength durable for the hypobaric pressure.

The present invention may be modified without departing from the spirit and scope of the present invention.

We claim:

1. A deodorizing reinforced container for low pressure, low temperature and humidified storage comprising:

a housing including an outer shell lined with a thermally insulative lining on an inside surface of said outer shell, an inner shell separating from the outer shell and circumferentially confining a storing chamber within said inner shell for storing preservation materials in said storing chamber, a cooling hypobaric device and a humidifier installed in said storing chamber for producing low pressure, low temperature and increasing humidity in said storing chamber for freshening the preservation materials therein;

a plurality of reinforcing ribs longitudinally and latitudinally formed in said housing, each said reinforcing rib retained in between said inner shell and said outer shell lined with said thermally insulative lining; and a deodorizing means provided in said housing for deodorizing and absorbing excess unexpected odors and gases as laden in the air in said storing chamber of said housing.

2. A deodorizing reinforced container according to claim 1, wherein said deodorizing means includes: a discharging header provided in an upper portion of the housing having a plurality of branched pipes juxtapositionally connected and fluidically communicated with the discharging header, and a plurality of spray nozzles formed on each said branched pipe for discharging air as deodorized into the storing chamber of the housing through the discharging header and the branched pipes, a packing tower connected with the discharging header and installed in a sandwiched space between the inner shell and the outer shell of said housing having an absorbent filler filled in the packing tower for absorbing unexpected odors and gases laden in the air from the storing chamber, and a circulating fan connected to an inlet of the packing tower for sucking air from the storing chamber through a suction pipe connected between the fan and the storing chamber.

3. A deodorizing reinforced container according to claim 2, wherein said absorbent filler in said packing tower is an activated carbon.

4. A deodorizing reinforced container according to claim 2, wherein said absorbent filler is a potassium hypermanganate impregnated in vermiculite.

* * * * *